United States Patent
Tajima et al.

(10) Patent No.: US 9,504,094 B2
(45) Date of Patent: Nov. 22, 2016

(54) BASE STATION, COMMUNICATION SYSTEM, AND COMMUNICATION METHOD

(71) Applicant: FUJITSU LIMITED, Kawasaki-shi, Kanagawa (JP)

(72) Inventors: Yoshiharu Tajima, Yokohama (JP); Yoshinori Tanaka, Yokohama (JP); Yoshihiro Kawasaki, Kawasaki (JP); Yoshiaki Ohta, Yokohama (JP); Katsumasa Sugiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 181 days.

(21) Appl. No.: 14/036,944

(22) Filed: Sep. 25, 2013

(65) Prior Publication Data

US 2014/0022998 A1    Jan. 23, 2014

Related U.S. Application Data

(63) Continuation of application No. PCT/JP2011/057481, filed on Mar. 25, 2011.

(51) Int. Cl.
| | |
|---|---|
| H04B 7/185 | (2006.01) |
| H04W 88/08 | (2009.01) |
| H04L 5/00 | (2006.01) |
| H04W 76/02 | (2009.01) |
| H04W 12/04 | (2009.01) |

(52) U.S. Cl.
CPC .............. *H04W 88/08* (2013.01); *H04L 5/001* (2013.01); *H04W 12/04* (2013.01); *H04W 76/02* (2013.01)

(58) Field of Classification Search
CPC ... H04W 88/08; H04W 76/02; H04W 12/04; H04L 5/001
USPC .................................................... 370/328, 316
See application file for complete search history.

(56) References Cited

U.S. PATENT DOCUMENTS

| | | | |
|---|---|---|---|
| 8,675,583 B2 * | 3/2014 | Lee et al. ....................... 370/329 |
| 2004/0120283 A1 | 6/2004 | Rezaiifar et al. |
| 2005/0111395 A1 * | 5/2005 | Hwang ............... H04L 12/1877 370/313 |
| 2006/0056333 A1 * | 3/2006 | Ogura ................... H04W 88/12 370/328 |

(Continued)

FOREIGN PATENT DOCUMENTS

| | | |
|---|---|---|
| CN | 101489306 A | 7/2009 |
| JP | 2009-246875 | 10/2009 |

(Continued)

OTHER PUBLICATIONS

Japanese International Preliminary Report for corresponding International Patent Application No. PCT/JP2011/057481, issued Oct. 10, 2013, with English translation.

(Continued)

*Primary Examiner* — Faisal Choudhury
(74) *Attorney, Agent, or Firm* — Myers Wolin, LLC

(57) ABSTRACT

A base station includes plural communication units that each includes a first processing unit that executes physical layer and data link layer processes of radio communication between the base station and a mobile station, and a second processing unit that executes network layer processes of the radio communication; and a third processing unit that is of a network layer and controls a series of radio communication sessions between the base station and the mobile station, based on carrier aggregation using the first processing unit of each of the communication units.

2 Claims, 12 Drawing Sheets

(56) References Cited

U.S. PATENT DOCUMENTS

| | | | |
|---|---|---|---|
| 2006/0142051 A1 | 6/2006 | Purnadi et al. | |
| 2008/0074994 A1* | 3/2008 | Jen | 370/218 |
| 2008/0194259 A1* | 8/2008 | Vujcic | H04W 74/0866 455/435.1 |
| 2010/0220671 A1 | 9/2010 | Guillouard et al. | |
| 2010/0304752 A1* | 12/2010 | Kitahara | H04W 76/027 455/450 |
| 2011/0032890 A1* | 2/2011 | Wu | H04L 5/001 370/329 |
| 2011/0038280 A1 | 2/2011 | Jung et al. | |
| 2011/0164584 A1* | 7/2011 | Seo | H04W 72/042 370/329 |
| 2011/0310820 A1* | 12/2011 | Liao | 370/329 |
| 2012/0057490 A1* | 3/2012 | Park et al. | 370/252 |
| 2012/0142361 A1* | 6/2012 | Zhao et al. | 455/446 |
| 2012/0157053 A1* | 6/2012 | Iwamura et al. | 455/411 |
| 2012/0314566 A1* | 12/2012 | Lee | H04W 76/028 370/225 |

FOREIGN PATENT DOCUMENTS

| | | | |
|---|---|---|---|
| JP | 2010-93854 | 4/2010 | |
| JP | 2010-154399 | 7/2010 | |
| JP | 2010-157994 | 7/2010 | |
| JP | 2011-024037 | 2/2011 | |
| JP | 2011-040851 | 2/2011 | |
| KR | 20100073105 A | 7/2010 | |
| WO | 2010/137155 | 12/2010 | |
| WO | WO 2011/032497 A1 * | 3/2011 | H04W 36/34 |

OTHER PUBLICATIONS

International search report issued for corresponding International Patent Application No. PCT/JP2011/057481, mailed Apr. 26, 2011.
Panasonic; "PDCCH coding and mapping for carrier aggregation"; Agenda Item: 12.1; 3GPP TSG-RAN-WG1 Meeting #56; R1-090682; Athens, Greece; Feb. 9-13, 2009.
3GPP TR 25.913 V7.3.0; 3rd Generation Partnership Project; Technical Specification Group Radio Access Network; "Requirements for Evolved UTRA (E-UTRA) and Evolved UTRAN (E-UTRAN) (Release 7)"; Mar. 2006.
3GPP TR 36.913 V8.0.1; 3rd Generation Partnership Project; Technical Specification Group Radio Access Network; "Requirements for further advancements for Evolved Universal Terrestrial Radio Access (E-UTRA) (LTE-Advanced) (Release 8)"; Mar. 2009.
3GPP TS 36.300 V10.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); "Overall description; Stage 2 (Release 10)"; Sep. 2010.
Mikio Iwamura et al. "Carrier Aggregation Framework in 3GPP LTE-Advanced" WiMAX/LTE Update, IEEE Communications Magazine, vol. 48, No. 8, Aug. 1, 2010, pp. 60-67, XP011315996, ISSN: 0163-6804.
Panasonic, "LTE-advanced discussion for RAN2" Agenda Item: 7, 3GPP TSG RAN WG2 Meeting #65big, R2-092394, Seoul, Korea, Mar. 23-27, 2009, per [ftp://ftp.3gpp.org/tsg_ran/WG2_RL2/TSGR2_65bis/Docs/].
Extended European search report with supplementary European search report and the European search opinion issued for corresponding European Patent Application No. 11862119.2, mailed on Apr. 2, 2015.
Office Action issued for corresponding Japan Patent Application 2013-506885 dated Sep. 30, 2014 with a partial translation.
Office Action issued for corresponding Korean Patent Application No. 10-2013-7025096 mailed on Jan. 30, 2015 with a partial English translation.
First Notification of Office Action issued for corresponding Chinese Patent Application No. 201180069492.4 issued on Dec. 22, 2015 with a partial English translation.
Second (2nd) Notification of Office Action issued for corresponding Chinese Patent Application No. 201180069492.4 issued on May 5, 2016 with a partial English translation.
Third (3rd) Notification of Office Action issued for corresponding Chinese Patent Application No. 201180069492.4 issued on Aug. 17, 2016 with a partial English translation.

* cited by examiner

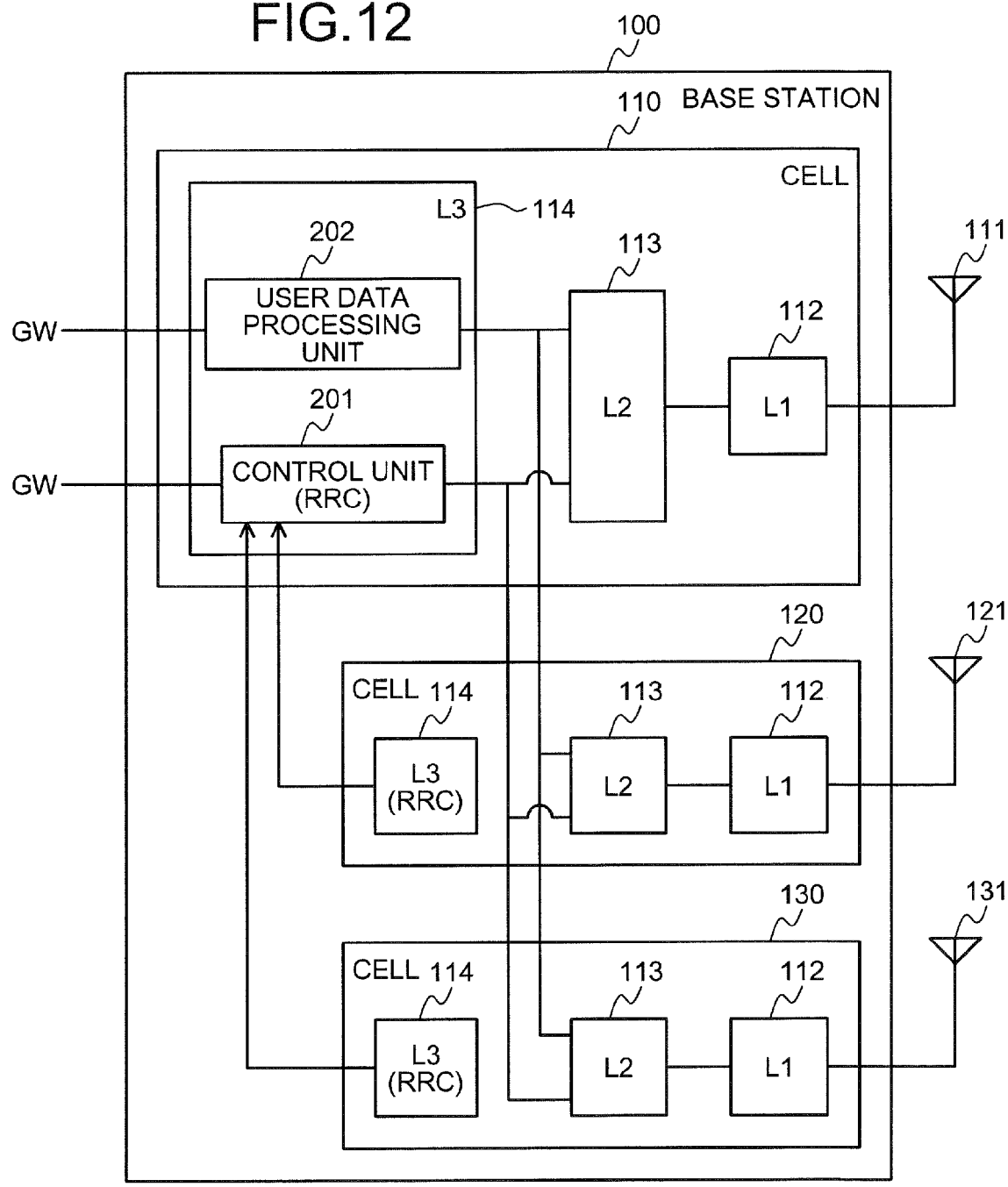

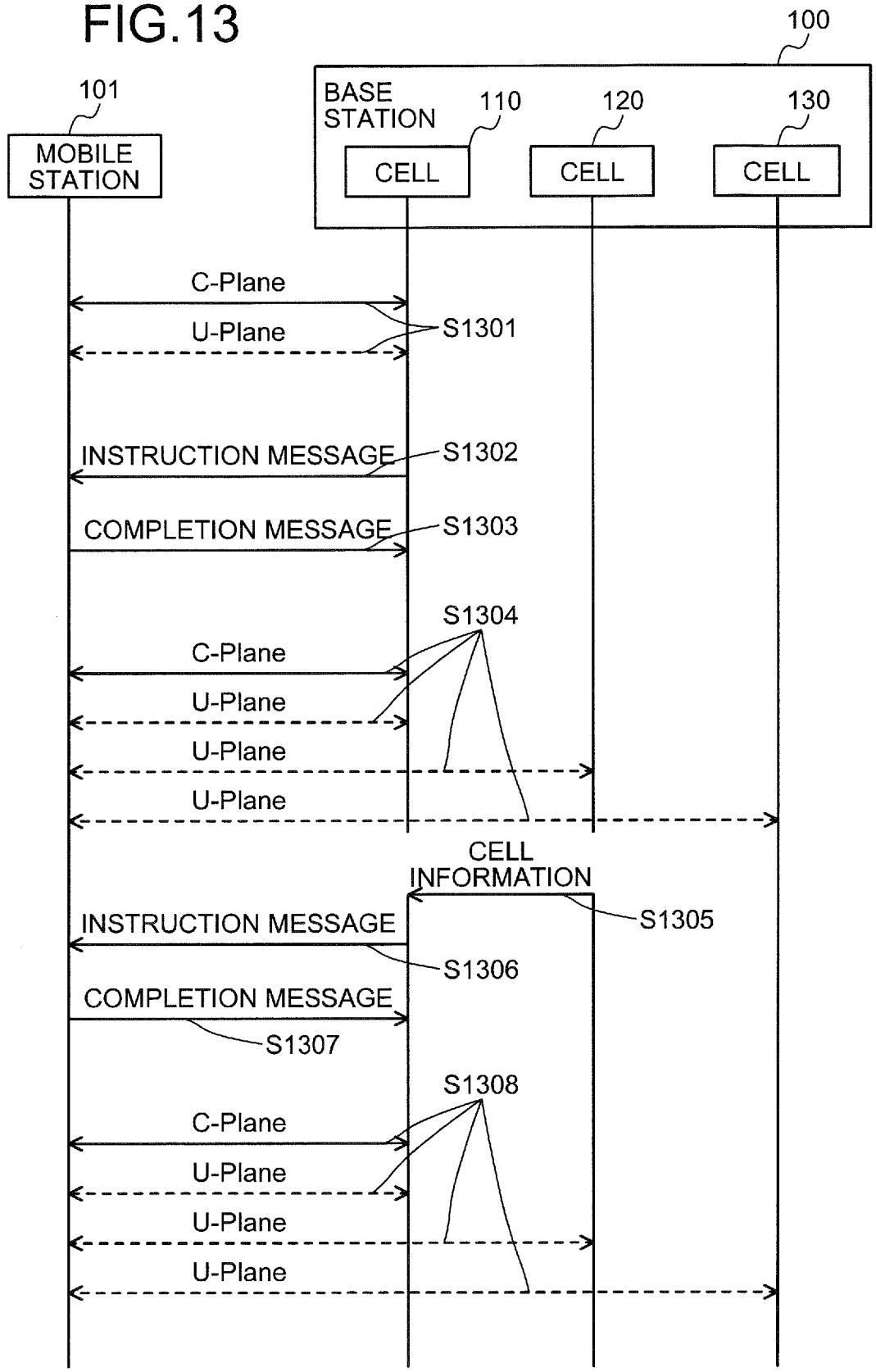

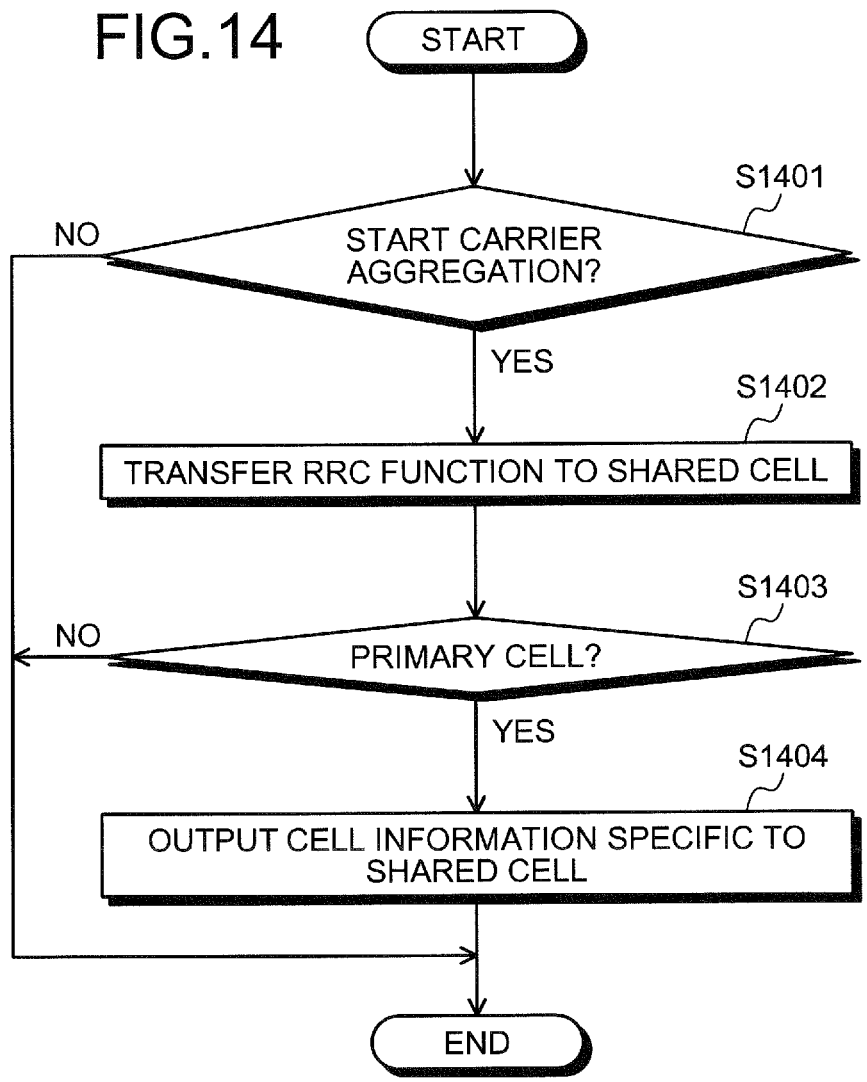

BASE STATION, COMMUNICATION SYSTEM, AND COMMUNICATION METHOD

CROSS REFERENCE TO RELATED APPLICATIONS

This application is a continuation application of International Application PCT/JP2011/057481, filed on Mar. 25, 2011 and designating the U.S., the entire contents of which are incorporated herein by reference.

FIELD

The embodiments discussed herein are related to a base station, a communication system, and a communication method that perform radio communication.

BACKGROUND

Cellular systems have become the main stream of mobile communication systems such as those for mobile telephones. In cellular system, a wide area is covered by combining plural areas (cells) that are of a communicable range of a base station, where a mobile station maintains communication by switching the base station with which communication is established, according to the movement of the mobile station. For example, a service of a third generation mobile communication system is currently provided based on a code division multiple access (CDMA) system. On the other hand, a next generation mobile communication system enabling communication at a higher speed is under consideration (see, e.g., Japanese Laid-Open Patent Publication Nos. 2010-154399, 2010-157994, 2010-9385, and 2009-246875).

For example, in the 3rd generation partnership project (3GPP), a long term evolution (LTE) and an LTE-advanced that is an advanced version of the LTE are under consideration. For the LTE-advanced, carrier aggregation is under consideration in which plural carrier frequencies (component carriers: CCs) are used combining the component carriers with each other aiming at improving transmission rate.

For the LTE, a configuration is under consideration in which the carrier aggregation is executed by, for example, combining plural existing cells taking into consideration compatibility with a conventional mobile station apparatus and simplicity of the configuration. In such a configuration, each of combined component carriers independently forms a single cell. Therefore, in the carrier aggregation, plural cells are combined and operate as one cell. A radio resource control (RRC) to control communication between the mobile station and a cell is set for the mobile station.

Therefore, in the carrier aggregation, the RRC is set for any one of the combined plural cells and this cell is referred to as "primary cell". The cells other than the primary cell among the plural cells are each referred to as "secondary cells". In a case where the mobile station communicates using such aggregation, when the primary cell changes consequent to variation of the communication quality, etc., the primary cell and any one of the secondary cells are exchanged with each other. The procedure for this exchange includes, for example, delivery and reception of key information in a secrecy process and, for example, a procedure for handing over is used. For example, a cell whose communication quality is the highest is set to be the primary cell to stably control the radio communication.

However, according to the conventional techniques, when the primary cell changes consequent to, for example, variation of the communication quality in a configuration to execute the carrier aggregation by combining the plural existing cells, a complicated procedure for the handing over is executed. Therefore, an instantaneous interruption or a delay of the communication may occur and a problem arises in that the radio communication based on the carrier aggregation becomes unstable.

SUMMARY

According to an aspect of an embodiment, a base station that includes plural communication units that each includes a first processing unit that executes physical layer and data link layer processes of radio communication between the base station and a mobile station, and a second processing unit that executes network layer processes of the radio communication; and a third processing unit that is of a network layer and controls a series of radio communication sessions between the base station and the mobile station, based on carrier aggregation using the first processing unit of each of the communication units.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram of a second configuration example of the base station depicted in FIG. 1;

FIG. 13 is a sequence diagram of an example of operation of the communication system corresponding to the second configuration example depicted in FIG. 12; and FIG. 14 is a flowchart of an example of a process of the cell corresponding to the second configuration example depicted in FIG. 12.

DESCRIPTION OF EMBODIMENTS

Embodiments of a base station, a communication system, and a communication method according to the present invention will be described in detail with reference to the accompanying drawings.

Figure 1:
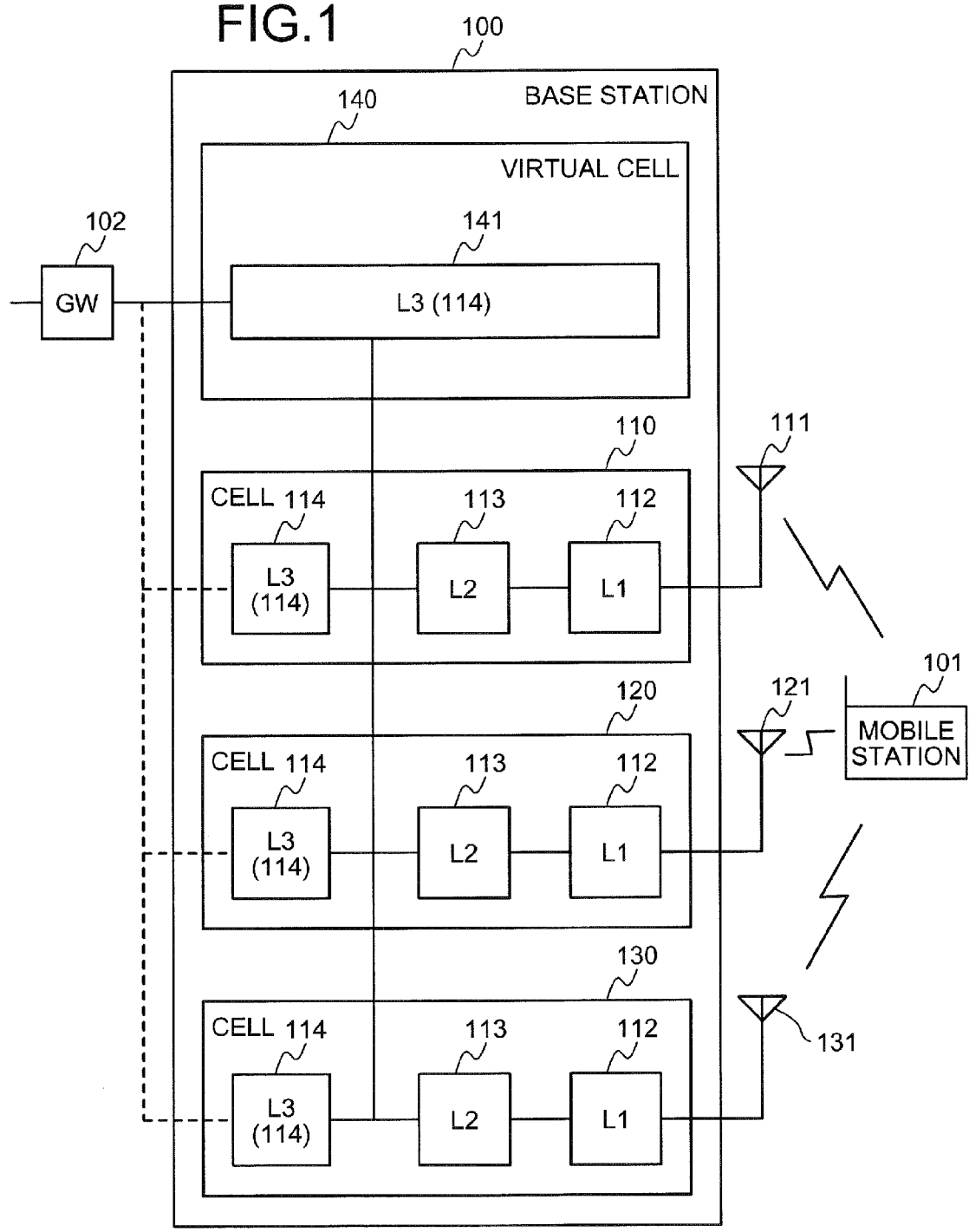
FIG. 1 is a diagram of an example of a configuration of a communication system according to a first embodiment.

FIG. 1 is a diagram of an example of a configuration of a communication system according to a first embodiment. As depicted in FIG. 1, the communication system according to the first embodiment includes a base station 100, a mobile station 101, and a gateway 102. The mobile station 101 is, for example, a user equipment (UE) defined under the LTE.

The base station 100 executes radio communication with the mobile station 101. The base station 100 is connected to a backbone network through the gateway 102 and relays the communication between the mobile station 101 and the backbone network. The base station 100 is, for example, an evolutional node B (eNB) defined under the LTE.

The base station 100 includes antennas 111, 121, and 131, cells 110, 120, and 130, and a virtual cell 140. The cell 110 is a communication unit that includes a physical layer processing unit 112 (L1), a data link layer processing unit 113 (L2), and a network layer processing unit 114 (L3). The physical layer processing unit 112 and the data link layer processing unit 113 form a first processing unit that executes physical layer and data link layer processes of the radio communication with the mobile station 101.

For example, using the antenna 111, the physical layer processing unit 112 executes physical layer (layer 1) processes for the radio communication with the mobile station 101. Physical layer processes include, for example, a process of transmitting waves via the antenna 111 and a process of converting waves received via the antenna 111 into an electrical signal.

The data link layer processing unit 113 executes data link layer (layer 2) processes for the radio communication with the mobile station 101, using the antenna 111 and the physical layer processing unit 112. Data link layer processes include, for example, media access control (MAC) to execute radio resource allocation control and radio link control (RLC) to execute control of the radio link.

The network layer processing unit 114 is a second processing unit having a function of the RRC to execute network layer (layer 3) processes to control the radio communication with the mobile station 101, using the antenna 111, a physical layer processing unit 112, and a data link layer processing unit 113. The control of the radio communication by the network layer processing unit 114 includes, for example, control of the operations of the physical layer processing unit 112 and the data link layer processing unit 113, and a secrecy process for data. The network layer processing unit 114 relays communication between the mobile station 101 and the backbone network through the gateway 102.

The cell 120 is a communication unit that executes the radio communication with the mobile station 101 via the antenna 121. The cell 130 is a communication unit that executes the radio communication with the mobile station 101 via the antenna 131. The cells 120 and 130 each includes a physical layer processing unit 112, a data link layer processing unit 113, and a network layer processing unit 114 that are identical to those of the cell 110.

The base station 100 executes the radio communication with the mobile station 101 based on carrier aggregation using component carriers of the cells 110, 120, and 130 in a predetermined case. Basically, the base station 100 executes the carrier aggregation using the physical layer processing unit 112 and the data link layer processing unit 113 (the first processing unit) of each of the cells 110, 120, and 130. The predetermined case to execute the carrier aggregation is, for example, a case where the amount of data transmitted and received with the mobile station 101 exceeds a threshold value.

The virtual cell 140 is a communication unit that includes a network layer processing unit 141 (L3). The virtual cell 140 is, for example, a virtual cell that includes no antenna, no physical layer processing unit, no data link layer processing unit, etc. The network layer processing unit 141 is a third processing unit having a function for the RRC. The network layer processing unit 141 executes network layer processes to control a series of radio communication sessions between the mobile station 101 and the base station 100 based on the carrier aggregation that uses the component carriers of the cells 110, 120, and 130.

A series of radio communication sessions between the mobile station 101 and the base station 100 is, for example, communication sessions executed from the establishment of a link between the mobile station 101 and the base station 100 to disconnection of the link between the mobile station 101 and the base station 100. The network layer processing unit 141 executes, for example, network layer processes for the series of radio communication sessions with the mobile station 101, using the physical layer processing unit 112 and the data link layer processing unit 113 of each of the cells 110, 120, and 130. The network layer processing unit 141 relays the communication between the mobile station 101 and the network through the gateway 102.

Thus, when the base station 100 executes the carrier aggregation with the mobile station 101, the network layer processing unit 114 of each of the cells 110, 120, and 130 does not need to execute network layer processes concerning the mobile station 101. On the other hand, when the base station 100 does not execute the carrier aggregation, the network layer processing unit 141 does not need to execute network layer processes.

The base station 100 depicted in FIG. 1 is configured to execute the carrier aggregation by combining plural cells that each have the physical layer processing unit 112, the data link layer processing unit 113, and the network layer processing unit 114. Therefore, the compatibility with the conventional mobile station apparatuses can be improved and the base station 100 can easily be realized by changing the conventional base station apparatus.

One cell (the virtual cell 140) controls the series of radio communication sessions between the mobile station 101 and the base station 100 based on the carrier aggregation. During the communication between the mobile station 101 and the base station 100 based on the carrier aggregation, the control of the radio communication is not transferred from the virtual cell 140 to any other cell. Thus, the carrier aggregation can be executed without executing any complicated switching operation of the primary cell controlling the radio communication. Therefore, instantaneous interruptions and delays of the radio communication can be suppressed and the radio communication can be stabilized.

A case where carrier aggregation using three combined carrier components is executed has been described. However, the number of carrier components combined in the carrier aggregation is not limited to three.

The data link layer processing unit 113 and the network layer processing unit 114 of each of the cells 110, 120, and 130, and the network layer processing unit 141 of the virtual cell 140 can each be realized by, for example, one or plural computing unit(s) such as a digital signal processor (DSP) and a field programmable gate array (FPGA).

For example, when the mobile station 101 executes radio communication with any one of the cells 110, 120, and 130, the mobile station 101 measures the quality of reception from the cell with which the mobile station 101 currently executes the radio communication, and transmits the measurement result to the cell with which the mobile station 101 currently executes the radio communication. For example, when the mobile station 101 executes radio communication based on the carrier aggregation using the cells 110, 120, and 130, the mobile station 101 measures the quality of reception from the primary cell of the carrier aggregation of the cells 110, 120, and 130. The mobile station 101 transmits the measurement result (measurement report) to the primary cell of the carrier aggregation.

In a first configuration example of the base station 100, the cell set as the primary cell is the virtual cell 140 regardless of the variation of the communication quality of the cells 110, 120, and 130.

Figure 2:
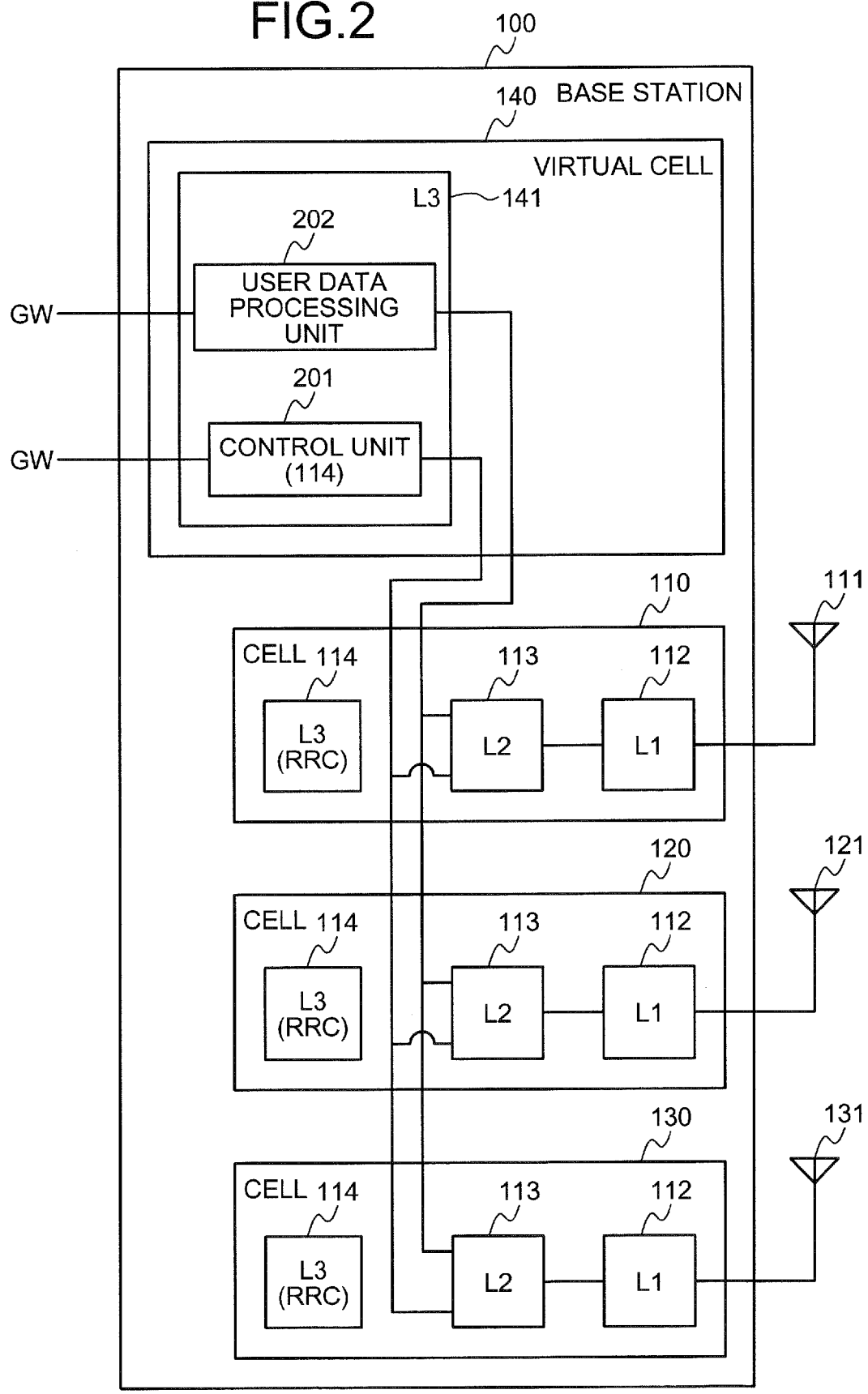
FIG. 2 is a diagram of a first configuration example of a base station depicted in FIG. 1.

FIG. 2 is a diagram of the first configuration example of the base station depicted in FIG. 1. In FIG. 2, portions identical to those depicted in FIG. 1 are given the same reference numerals used in FIG. 1 and will not again be described. The network layer processing unit 141 of the virtual cell 140 included in the base station 100 includes, for example, a control unit 201 and a user data processing unit 202.

The control unit 201 has an RRC function of terminating a C-plane (a control signal system) established with the mobile station 101 through the physical layer processing unit 112 and the data link layer processing unit 113 of each of the cells 110, 120, and 130. The control unit 201 transmits and receives to/from the gateway 102, a control signal transmitted and received to/from the mobile station 101 in the C-plane.

The user data processing unit 202 terminates a U-plane established with the mobile station 101 through the physical layer processing unit 112 and the data link layer processing unit 113 of each of the cells 110, 120, and 130. The user data processing unit 202 transmits and receives to/from the gateway 102 user data that is transmitted and received to/from the mobile station 101 in the U-plane (a main signal system).

Figure 3:
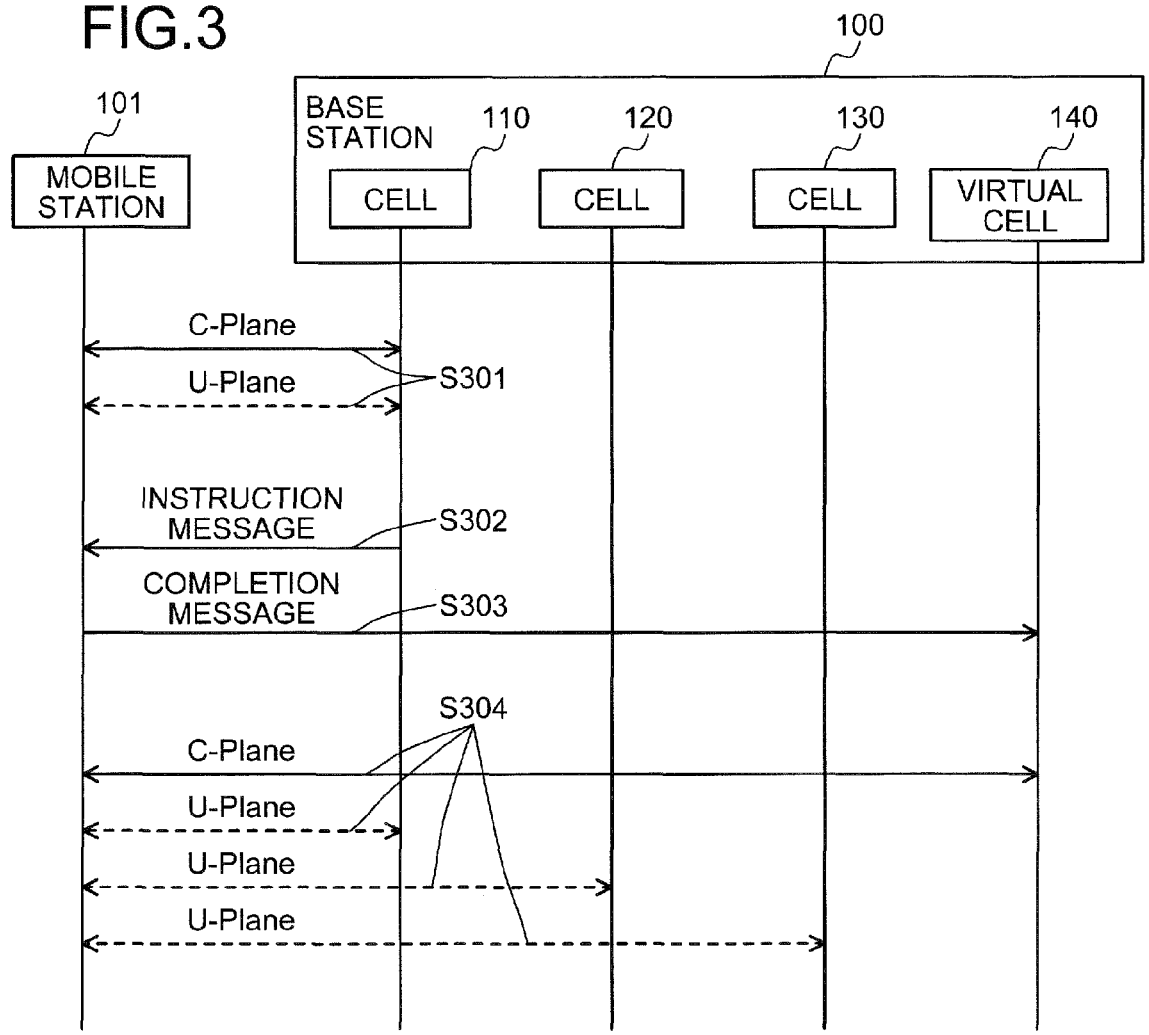
FIG. 3 is a sequence diagram of an example of operation of the communication system corresponding to the first configuration example depicted in FIG. 2.

FIG. 3 is a sequence diagram of an example of operation of the communication system corresponding to the first configuration example depicted in FIG. 2. As depicted in FIG. 3, it is assumed that the mobile station 101 executes communication with the cell 110 of the base station 100 (step S301). For example, the mobile station 101 establishes the C-plane and the U-plane with the cell 101.

The cell 110 transmits to the mobile station 101, an instruction message instructing a start of the carrier aggregation using the virtual cell 140 as the primary cell (step S302). The instruction message transmitted at step S302 is, for example, "RRC Reconfiguration" transmitted as an RRC signal.

The mobile station 101 sets the primary cell of the carrier aggregation to be the virtual cell 140 and transmits a completion message to the virtual cell 140 (step S303). The completion message transmitted at step S303 is, for example, "RRC Reconfiguration Complete" transmitted as an RRC signal. The completion message transmitted at step S303 is received by, for example, the virtual cell 140 through the cells 110, 120, and 130.

The mobile station 101 starts radio communication with the cells 110, 120, and 130 of the base station 100, based on the carrier aggregation (step S304). For example, the mobile station 101 establishes the C-plane with the virtual cell 140. The mobile station 101 establishes a radio link with each of the cells 110, 120, and 130 and transmits the user data (U-plane).

In this manner, during the execution of the series of radio communication sessions based on the carrier aggregation between the mobile station 101 and the cells 110, 120, and 130, the virtual cell 140 is fixed as the primary cell. Therefore, no handing-over operation (such as a change of the secrecy key) occurs associated with the change of the primary cell. Therefore, instantaneous interruptions and delays of the communication can be suppressed and the radio communication can be stabilized in the radio communication based on the carrier aggregation between the mobile station 101 and the cells 110, 120, and 130.

In this manner, in the first configuration example, the instruction message instructing the execution of the processes in the network layer with the network layer processing unit 141 of the virtual cell 140 is transmitted to the mobile station 101. For example, the physical layer processing unit 112 and the data link layer processing unit 113 of at least any one of the cells 110, 120, and 130 can be used as the transmitting unit that transmits the instruction message. In contrast, the network layer processing unit 141 of the virtual cell 140 executes network layer processes with the mobile station 101. The network layer processes executed between the network layer processing unit 141 and the mobile station 101 include, for example, a secrecy process for data (for example, the user data) transmitted by the radio communication.

Figure 4:
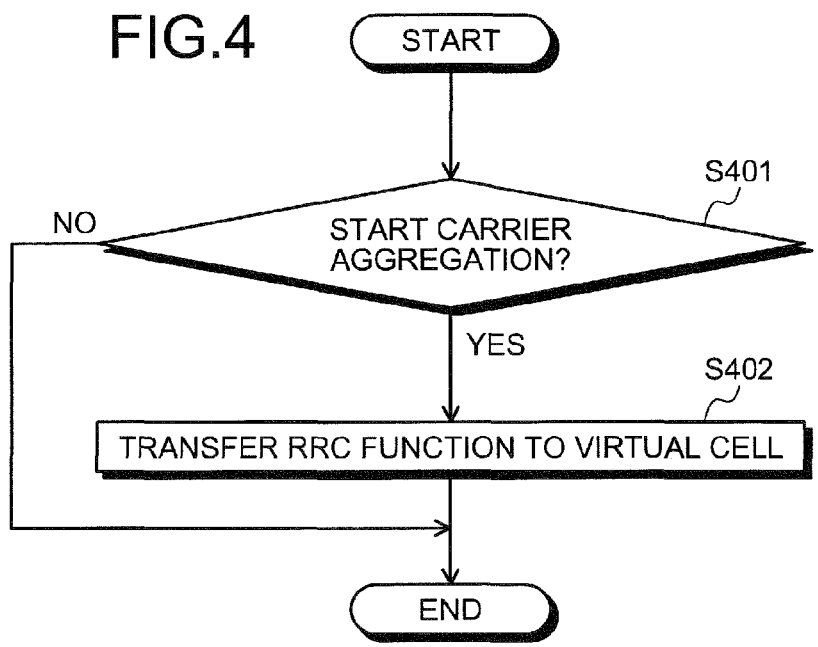
FIG. 4 is a flowchart of an example of a process of a cell corresponding to the first configuration example depicted in FIG. 2.

FIG. 4 is a flowchart of an example of a process of a cell corresponding to the first configuration example depicted in FIG. 2. When the cell 110 depicted in FIG. 2 executes the radio communication using a single carrier component with the mobile station 101, the cell 110 executes, for example, the process steps depicted in FIG. 4. Although the process executed by the cell 110 will be described, the cells 120 and 130 may each execute the same process.

The cell 110 determines whether the cell 110 is to start carrier aggregation with the mobile station 101 (step S401). The determination as to whether the cell 110 is to start carrier aggregation is made based on, for example, the communication quality and the traffic amount between the mobile station 101 and the base station 100. If the cell 110 determines that the cell 110 is not to start carrier aggregation with the mobile station 101 (step S401: NO), the cell 110 causes the series of operations to come to an end.

If the cell 110 determines at step S401 that the cell 110 is to start the carrier aggregation with the mobile station 101 (step S401: YES), the cell 110 progresses to the operation at step 402. The cell 110 transfers the RRC function thereof for radio communication with the mobile station 101, to the virtual cell 140 (step S402) and causes the series of operations to come to an end. After executing the operation at step S402, the cell 110 performs transmission and reception using one of the carrier components included in the carrier aggregation executed between the mobile station 101 and the virtual cell 140.

At step S402, for example, the cell 110 controls the virtual cell 140 to execute the RRC process for the radio communication based on the carrier aggregation between the base station 100 and the mobile station 101. The cell 110 transmits to the mobile station 101, an instruction message instructing the mobile station 101 to start the carrier aggregation. The cell 110 discontinues the RRC process for the radio communication executed using the single carrier component with the mobile station 101.

In a second configuration example of the base station 100, the one of the cells 110, 120, and 130 set to be the primary cell is changed due to variation of the communication quality, etc. of the cells 110, 120, and 130. However, the RRC process is terminated by the virtual cell 140 through at least any one of the cells 110, 120, and 130.

Figure 5:
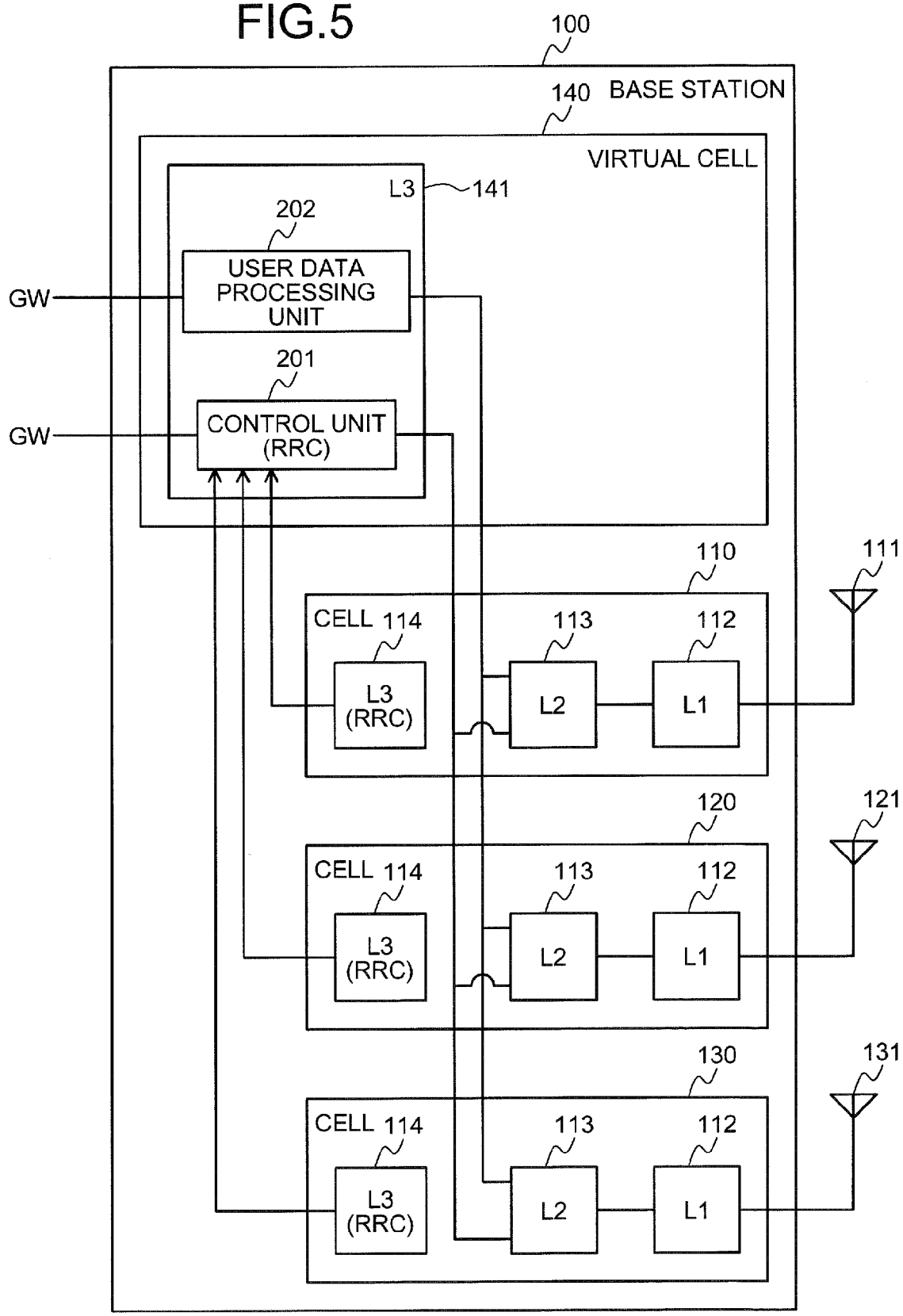
FIG. 5 is a diagram of a second configuration example of the base station depicted in FIG. 1.

FIG. 5 is a diagram of the second configuration example of the base station depicted in FIG. 1. In FIG. 5, portions identical to the portions depicted in FIG. 2 are given the same reference numerals used in FIG. 2 and will not again be described. When the carrier aggregation is started, as depicted in FIG. 5, the network layer processing unit 114 of the cell set to be the primary cell among the cells 110, 120, and 130 may output to the virtual cell 140 cell information (RRC parameter) used for the RRC process. The cell information is a parameter specific to each cell. The cell information is, for example, key information used for the secrecy process of data in the RRC.

The control unit 201 of the virtual cell 140 executes the RRC process, using the cell information of the cell set to be the primary cell among the cells 110, 120, and 130. Thus, the virtual cell 140 can execute an RRC process equivalent to that of the cell set to be the primary cell of the cells 110, 120, and 130.

For example, when the cell 110 is set to be the primary cell, the control unit 201 acquires as the cell information from the cell 110, the key information specific to the cell 110. The control unit 201 executes an RRC process that includes a data secrecy process that uses the acquired key information. If the primary cell is changed from the cell 110 to the cell 120, the control unit 201 acquires as the cell information from the cell 120, the key information specific to the cell 120. The control unit 201 executes an RRC process that includes a data secrecy process that uses the acquired key information.

Figure 6:
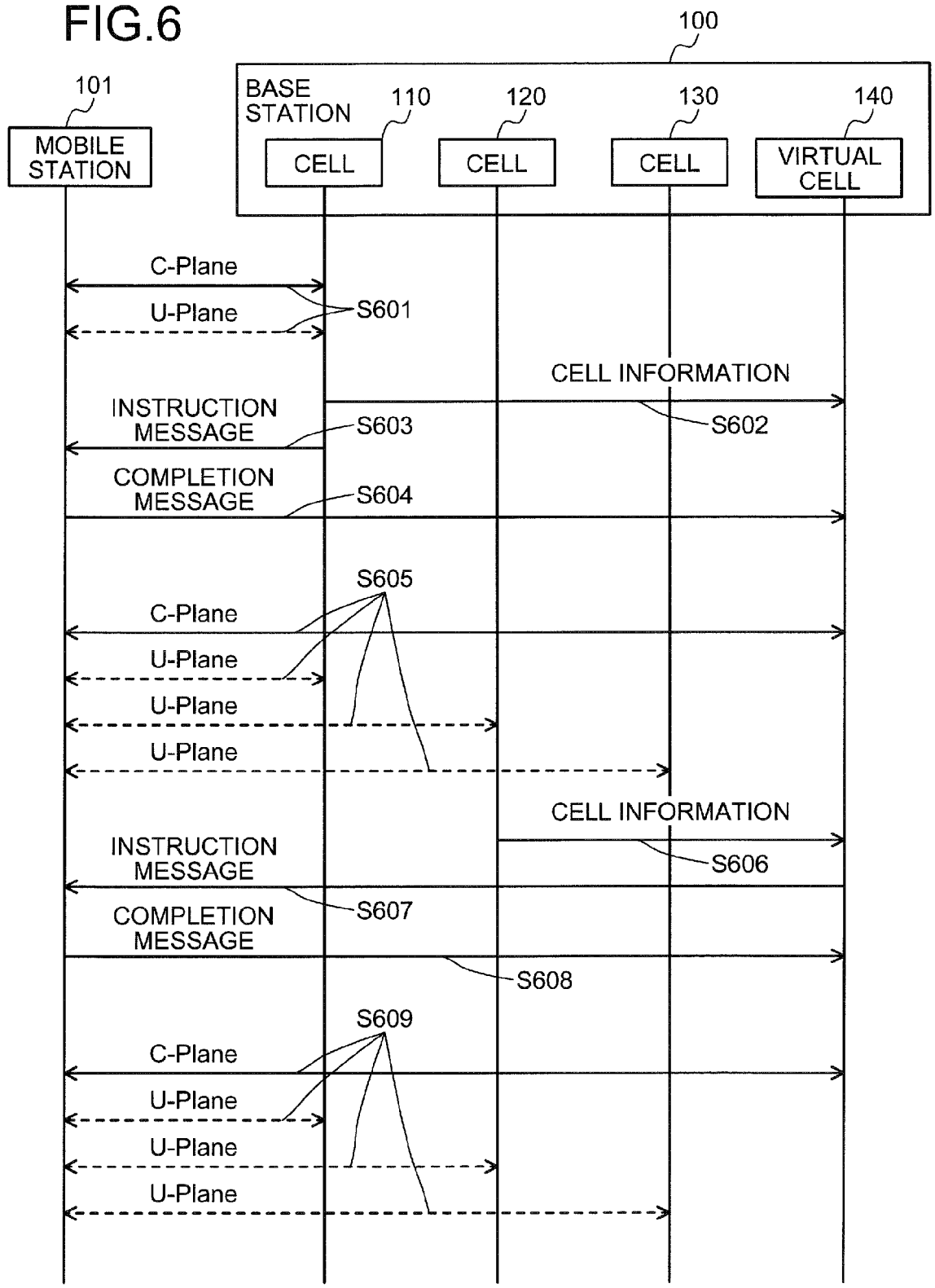
FIG. 6 is a sequence diagram of an example of operation of the communication system corresponding to the second configuration example depicted in FIG. 5.

FIG. 6 is a sequence diagram of an example of operation of the communication system corresponding to the second configuration example depicted in FIG. 5. As depicted in FIG. 6, it is assumed that the mobile station 101 executes communication with the cell 110 of the base station 100 (step S601). For example, the mobile station 101 establishes the C-plane and the U-plane with the cell 110.

The cell 110 outputs to the virtual cell 140, the cell information specific to the cell 110 (step S602). The cell 110 transmits to the mobile station 101, an instruction message instructing a start of the carrier aggregation using the cell 110 as the primary cell (step S603). The mobile station 101 sets the primary cell of the carrier aggregation to be the cell 110 and transmits a completion message to the cell 110 (step S604). For example, the completion message transmitted at step S604 is transferred to the virtual cell 140 by the cells 110, 120, and 130.

The mobile station 101 sets the cell 110 to be the primary cell and starts the radio communication based on the carrier aggregation with the cells 110, 120, and 130 of the base station 100 (step S605). For example, the mobile station 101 executes a process of establishing the C-plane with the cell 110 set to be the primary cell. In response to this, the virtual cell 140 establishes the C-plane with the mobile station 101, using the cell information specific to the cell 110 output at step S602.

The C-plane between the mobile station 101 and the virtual cell 140 is relayed by, for example, the cells 110, 120, and 130. Thus, at the mobile station 101, the cell 110 is set to be the primary cell while processing as the primary cell (the RRC process) is executed by the virtual cell 140. The mobile station 101 establishes the U-plane with each of the cells 110, 120, and 130.

It is assumed that the primary cell of the carrier aggregation between the mobile station 101 and the base station 100 is changed from the cell 110 to the cell 120. In this case, the cell 120 outputs to the virtual cell 140, the cell information specific to the cell 120 (step S606). The virtual cell 140 transmits an instruction message instructing a start of the carrier aggregation using the cell 120 as the primary cell, to the mobile station 101 through, for example, the cells 110, 120, and 130 (step S607). The mobile station 101 sets the primary cell for the carrier aggregation to be the cell 120 and transmits a completion message to the cell 120 (step S608). The completion message transmitted at step S608 is transferred to the virtual cell 140 by, for example, the cells 110, 120, and 130.

The mobile station 101 sets the cell 120 to be the primary cell and starts radio communication with the cells 110, 120, and 130 of the base station 100, based on the carrier aggregation (step S609). For example, the mobile station 101 executes the process of establishing the C-plane with the cell 120 set to be the primary cell. In response to this, the virtual cell 140 establishes the C-plane with the mobile station 101, using the cell information specific to the cell 120 output at step S606.

The C-plane between the mobile station 101 and the virtual cell 140 is relayed by, for example, the cells 110, 120, and 130. Therefore, the cell 120 is set to be the primary cell in the mobile station 101 while the virtual cell 140 executes processing as the primary cell (RRC processing). The mobile station 101 establishes the U-plane with each of the cells 110, 120, and 130.

Thus, during the communication based on the carrier aggregation between the mobile station 101 and the cells 110, 120, and 130, even when the primary cell is changed, the virtual cell 140 executes processing as the primary cell. Therefore, no complicated handing-over operation (such as a change of the secrecy key) occurs associated with the change of the primary cell. As a result, in the radio communication based on the carrier aggregation between the mobile station 101 and the cells 110, 120, and 130, instantaneous interruptions and delays of the communication can be suppressed and the radio communication can be stabilized.

At each of the steps S602 and S606, the cell information is output by, for example, a "x2 interface". Each of the instruction messages transmitted at steps S603 and S607 is, for example, "RRC Reconfiguration" transmitted as an RRC signal. Each of the completion messages transmitted at steps S604 and S608 is, for example, "RRC Reconfiguration Complete" transmitted as an RRC signal.

As described, in the second configuration example, the instruction message instructing execution of the processes in the network layer with the predetermined cell (the primary cell) included in the cells 110, 120, and 130 is transmitted to the mobile station 101. For example, the physical layer processing unit 112 and the data link layer processing unit 113 of at least any one of the cells 110, 120, and 130 can be used as the transmitting unit that transmits the instruction messages.

In contrast, the network layer processing unit 114 of the cell 110 acquires the parameters (cell information) used for the network layer processes specific to the predetermined cell, and executes the network layer processes with mobile station 101, using the acquired parameters. The network layer processes executed between the network layer processing unit 114 and the mobile station 101 include, for example, the secrecy process of the data (for example, the user data) transmitted by the radio communication. In this case, the parameters used in the network layer processes include, for example, the key information for the secrecy process.

Figure 7:
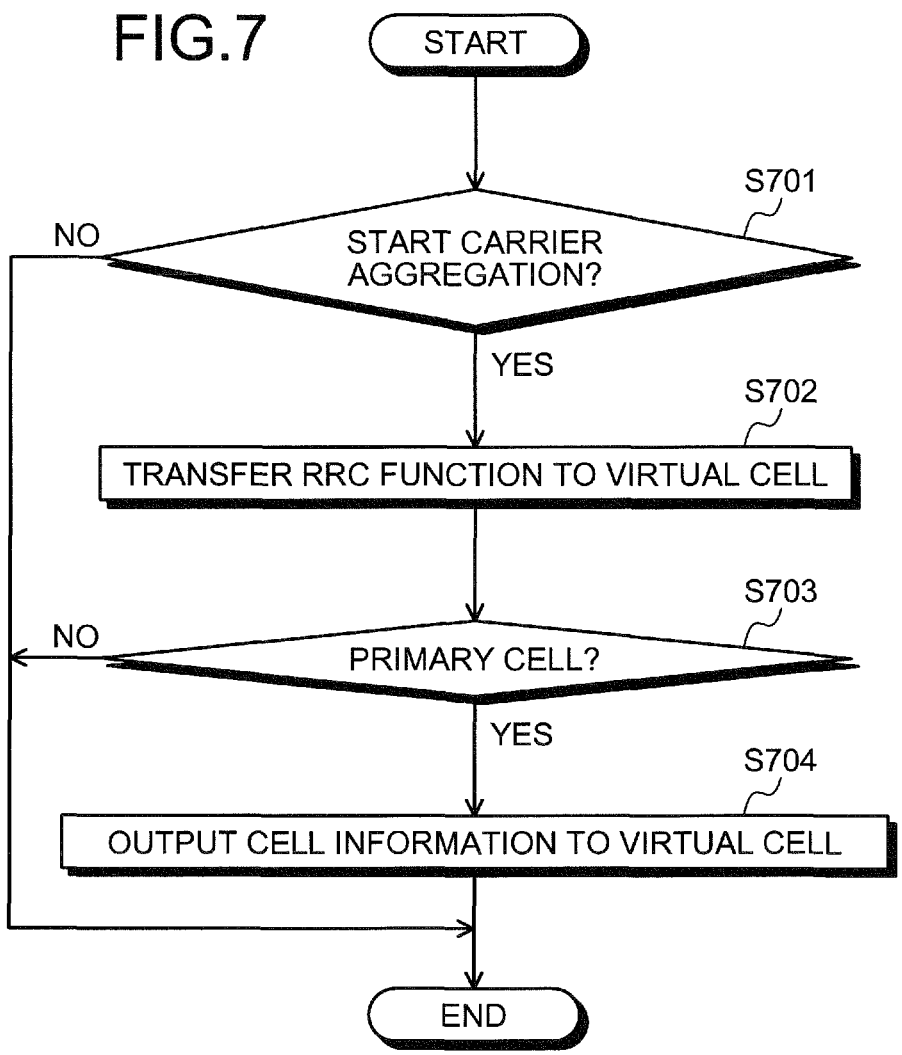
FIG. 7 is a flowchart of an example of a process of the cell corresponding to the second configuration example depicted in FIG. 5.

FIG. 7 is a flowchart of an example of a process of the cell corresponding to the second configuration example depicted in FIG. 5. The cell 110 depicted in FIG. 5 execute, for example, the operations depicted in FIG. 7 when the cell 110 executes the radio communication using a single carrier component with the mobile station 101. Although a process of the cell 110 will be described, the cells 120 and 130 may each execute the same process.

Steps S701 and S702 depicted in FIG. 7 are respectively same as steps S401 and S402 depicted in FIG. 4. After executing the operation at step S702, the cell 110 determines whether the cell 110 is the primary cell of the carrier aggregation (step S703). For example, the primary cell of the carrier aggregation is set to be the cell immediately previously executing the radio communication with the mobile station 101. For example, when the carrier aggregation is started in the example depicted in FIG. 6, the cell 110 is the primary cell of the carrier aggregation.

If the cell 110 determines at step S703 that the cell 110 is not the primary cell of the carrier aggregation (step S703: NO), the cell 110 causes the series of operations to come to an end. Thereafter, the cell 110 executes transmission and reception of one of the carrier components included in the carrier aggregation executed between the mobile station 101 and the virtual cell 140.

If the cell 110 determines at step S703 that the cell 110 is the primary cell of the carrier aggregation (step S703: YES), the cell 110 outputs to the virtual cell 140, the cell information specific to the cell 110 (step S704) and causes the series of operations to come to an end. Thereafter, the cell 110 executes transmission and reception of one of the carrier components included in the carrier aggregation executed between the mobile station 101 and the virtual cell 140.

As described, according to the base station 100 of the first embodiment, the virtual cell 140 can control the series of radio communication sessions between the mobile station 101 and the base station 100 based on the carrier aggregation. Thereby, the carrier aggregation can be executed without executing any complicated switching operation of the primary cell that controls the radio communication. Therefore, instantaneous interruptions and delays of the radio communication can be suppressed and the radio communication can be stabilized.

Figure 8:
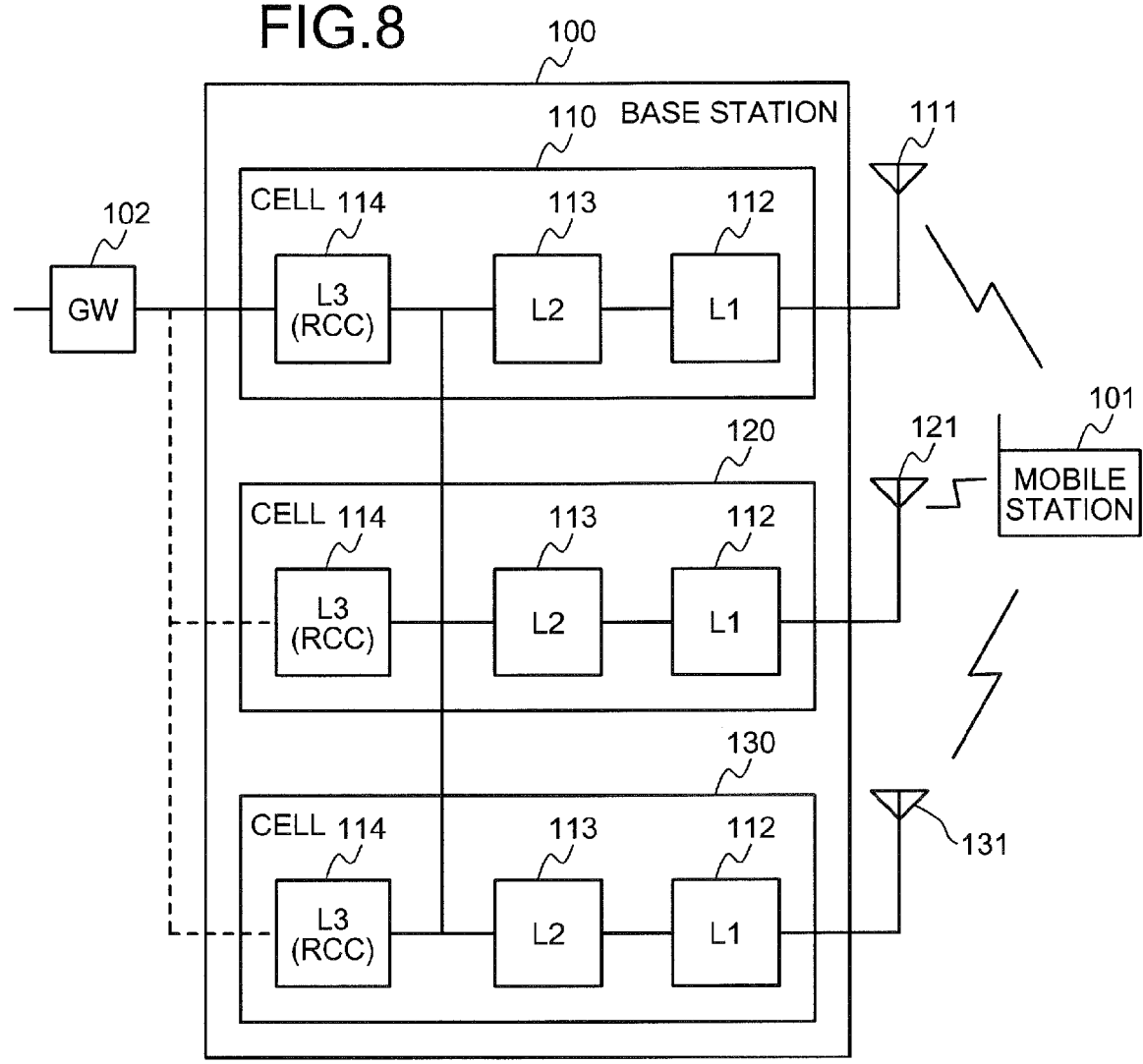
FIG. 8 is a diagram of an example of a configuration of the communication system according to a second embodiment.

FIG. 8 is a diagram of an example of a configuration of the communication system according to a second embodiment. In FIG. 8, portions identical to the portions depicted in FIG. 1 are given the same reference numerals used in FIG. 1 and will not again be described. As depicted in FIG. 8, the base station 100 according to the second embodiment includes the antennas 111, 121, and 131, and the cells 110, 120, and 130.

In the second embodiment, when the carrier aggregation is executed, any one of the cells 110, 120, and 130 is set to be a shared cell and the network layer processing unit 114 of the shared cell is shared and used among the cells 110, 120 and 130. For example, in the example depicted in FIG. 8, the cell 110 is set to be the shared cell and the network layer processing unit 114 of the cell 110 executes the network layer processes to control the radio communication with the mobile station 101, based on the carrier aggregation.

For example, the network layer processing unit 114 of the cell 110 executes network layer processes in the radio communication with the mobile station 101, by the physical layer processing unit 112 and the data link layer processing unit 113 of each of the cells 110, 120, and 130. Therefore, when the base station 100 executes the carrier aggregation with the mobile station 101, the network layer processing unit 114 of each of the cells 120 and 130 does not need to execute any network layer process concerning the mobile station 101.

As described, in the second embodiment, one of the cells 110, 120, and 130 controls the series of radio communication sessions between the mobile station 101 and the base station 100, based on the carrier aggregation. Thereby, the carrier aggregation can be executed without executing any complicated switching operation of the primary cell that controls the radio communication. Therefore, instantaneous interruptions and delays of the radio communication can be suppressed and the radio communication can be stabilized.

Not only the cell 110 but also the cell 120 or 130 may control the series of radio communication sessions based on the carrier aggregation. For example, the cell 110 may control the series of radio communication sessions based on the carrier aggregation with the mobile station 101 and the cell 120 or 130 may control the series of radio communication sessions based on the carrier aggregation with a mobile station different from the mobile station 101.

In a first configuration example of the base station 100, among the cells 110, 120, and 130, the cell set as the primary cell remains fixed regardless of any variation of the communication quality of the cells 110, 120, and 130.

Figure 9:
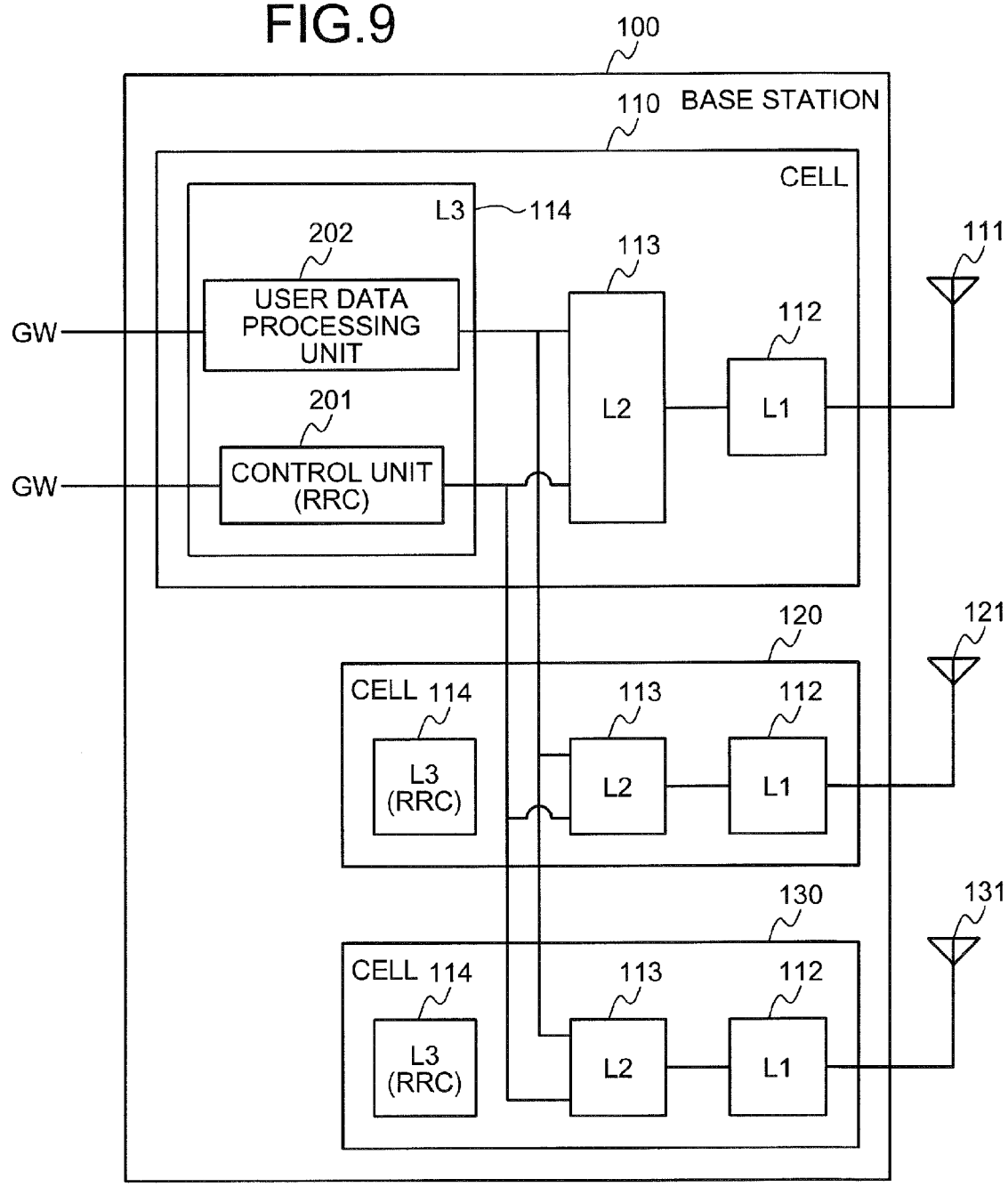
FIG. 9 is a diagram of a first configuration example of the base station depicted in FIG. 8.

FIG. 9 is a diagram of the first configuration example of the base station depicted in FIG. 8. In FIG. 9, portions identical to the portions depicted in FIG. 2 or 8 are given the same reference numerals used in FIGS. 2 and 8, and will not again be described. The network layer processing unit 114 of the cell 110 included in the base station 100 includes, for example, the control unit 201 and the user data processing unit 202.

The control unit 201 has a function of the RRC of terminating the C-plane (the control signal system) established with the mobile station 101 through the physical layer processing unit 112 and the data link layer processing unit 113 of each of the cells 110, 120, and 130. The control unit 201 transmits to and receives from the gateway 102, the control signal transmitted to and received from the mobile station 101 using the C-plane.

The user data processing unit 202 terminates the U-plane established with the mobile station 101 through the physical layer processing unit 112 and the data link layer processing unit 113 of each of the cells 110, 120, and 130. The user data processing unit 202 transmits to and receives from the gateway 102, the user data that is transmitted to and received from the mobile station 101, via the U-plane (the main signal system).

Figure 10:
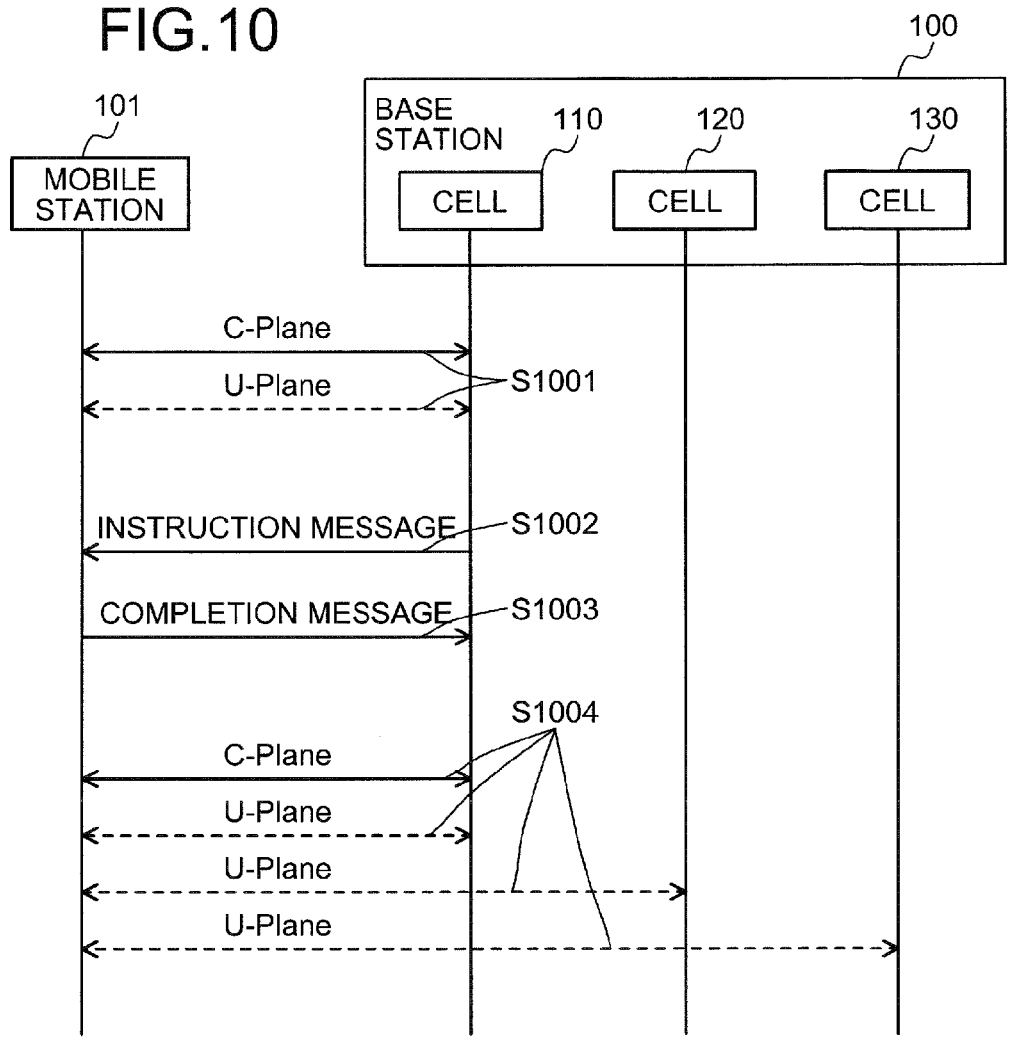
FIG. 10 is a sequence diagram of an example of operation of the communication system corresponding to the first configuration example depicted in FIG. 9.

FIG. 10 is a sequence diagram of an example of operation of the communication system corresponding to the first configuration example depicted in FIG. 9. As depicted in FIG. 10, it is assumed that the mobile station 101 currently executes communication with the cell 110 of the base station 100 (step S1001). For example, the mobile station 101 establishes the C-plane and the U-plane with the cell 110.

The cell 110 transmits to the mobile station 101, an instruction message instructing the start of the carrier aggregation using the cell 110 as the primary cell (step S1002). The instruction message transmitted at step S1002 is, for example, "RRC Reconfiguration" transmitted as an RRC signal.

The mobile station 101 sets the cell 110 to be the primary cell of the carrier aggregation and transmits a completion message to the cell 110 (step S1003). The completion message transmitted at step S1003 is, for example, "RRC Reconfiguration Complete" transmitted as an RRC signal.

The mobile station 101 starts radio communication based on the carrier aggregation with the cells 110, 120, and 130 of the base station 100 (step S1004). For example, the mobile station 101 establishes the C-plane with the cell 110. The mobile station 101 establishes a radio link with each of the cells 110, 120, and 130, and transmits the user data.

In this manner, during the execution of the series of radio communication sessions based on the carrier aggregation between the mobile station 101 and the base station 100, the cell 110 remains fixed as the primary cell. Therefore, no handing-over operation (such as a change of the secrecy key) occurs associated with the change of the primary cell. Therefore, instantaneous interruptions and delays of the communication can be suppressed and radio communication can be stabilized for the radio communication based on the carrier aggregation between the mobile station 101 and the cells 110, 120, and 130.

Figure 11:
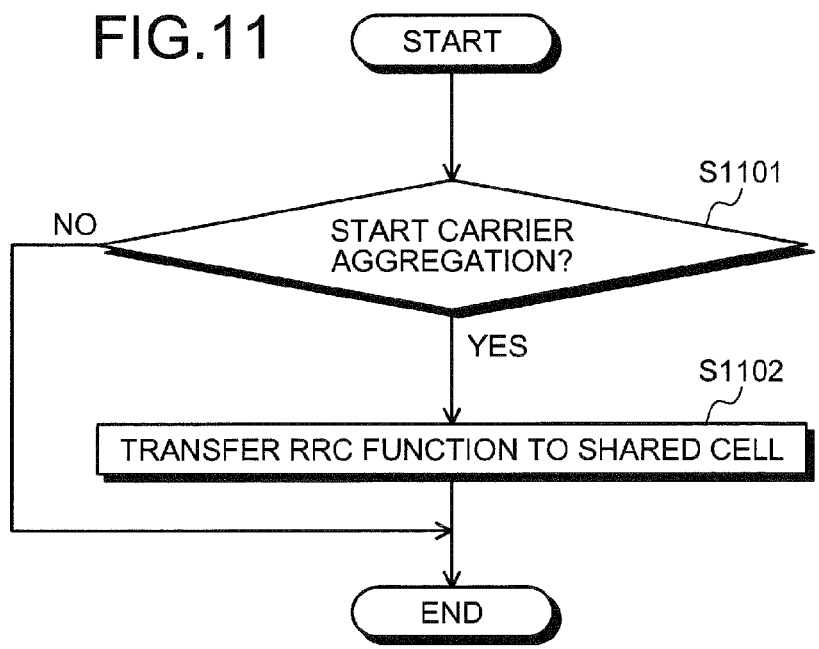
FIG. 11 is a flowchart of an example of a process of the cell corresponding to the first configuration example depicted in FIG. 2.

FIG. 11 is a flowchart of an example of a process of the cell corresponding to the first configuration example depicted in FIG. 2. The cell 110 depicted in FIG. 9 executes, for example, process steps depicted in FIG. 11 when the cell 110 executes the radio communication with the mobile station 101 using a single carrier component. Although a process of the cell 110 will be described, the cells 120 and 130 may each execute the same process.

The cell 110 determines whether the cell 110 is to start carrier aggregation with the mobile station 101 (step S1101). The determination as to whether the cell 110 is to start carrier aggregation is made based on, for example, the traffic amount between the mobile station 101 and the base station 100. If the cell 110 determines that the cell 110 is not to start carrier aggregation with the mobile station 101 (step S1101: NO), the cell 110 causes the series of operations to come to an end.

If the cell 110 determines at step S1101 that the cell 110 is to start carrier aggregation with the mobile station 101 (step S1101: YES), the cell 110 progresses to the operation at step 1102. The cell 110 transfers the RRC function thereof for the radio communication with the mobile station 101, to the shared cell controlling the radio communication based on the carrier aggregation (step S1102) and causes the series of operations to come to an end. After executing the operation at step S1102, the cell 110 performs transmission and reception using one of the carrier components included in the carrier aggregation executed between the mobile station 101 and the shared cell.

At step S1102, when the shared cell is the cell 110 as in, for example, the example depicted in FIG. 10, the cell 110 sets in the cell 110, the RRC function for the radio communication based on the carrier aggregation with the mobile station 101. On the other hand, if the shared cell is not the cell 110, the cell 110 controls the shared cell to start the RRC process for the radio communication based on the carrier aggregation with the mobile station 101.

The cell 110 transmits to the mobile station 101, an instruction message instructing the start of the carrier aggregation. The cell 110 discontinues the RRC process for the radio communication executed with the mobile station 101 using the single carrier component.

In a second configuration example of the base station 100, the one of the cells 110, 120, and 130 set to be the primary cell is changed due to variation of the communication quality, etc. of the cells 110, 120, and 130. However, the RRC process is executed by any one of the cells 110, 120, and 130.

FIG. 12 is a diagram of the second configuration example of the base station depicted in FIG. 1. In FIG. 12, portions identical to the portions depicted in FIG. 9 are given the same reference numerals used in FIG. 9 and will not again be described. It is assumed that the cell 110 is the shared cell. When the carrier aggregation using the cells 110, 120, and 130 with the cell 120 set to be the primary cell is started, the network layer processing unit 114 of the cell 120 outputs to the cell 110, the cell information specific to the cell 120 used for the RRC process.

When the carrier aggregation using the cells 110, 120, and 130 with the cell 130 set to be the primary cell is started, the network layer processing unit 114 of the cell 130 outputs to the cell 110, the cell information specific to the cell 130 used for the RRC process. When the carrier aggregation using the cells 110, 120, and 130 with the cell 110 set to be the primary cell is started, the cell 110 acquires the specific cell information set in the cell 110.

The control unit 201 of the cell 110 executes the RRC process using the cell information of the cell set to be the primary cell, among the cells 110, 120, and 130. Thereby, the cell 110 can execute an RRC process equivalent to that of the cell set to be the primary cell, among the cells 110, 120, and 130.

For example, when the cell 120 is set to be the primary cell, the control unit 201 acquires as the cell information from the cell 120, the key information specific to the cell 120. The control unit 201 executes an RRC process that includes a data secrecy process using the acquired key information. If the primary cell is changed from the cell 120 to the cell 130, the control unit 201 acquires as the cell information from the cell 120, the key information specific to the cell 130. The control unit 201 executes an RRC process that includes a data secrecy process using the acquired key information.

FIG. 13 is a sequence diagram of an example of operation of the communication system corresponding to the second configuration example depicted in FIG. 12. As depicted in FIG. 13, it is assumed that the mobile station 101 executes communication with the cell 110 of the base station 100 (step S1301). For example, the mobile station 101 establishes the C-plane and the U-plane with the cell 110.

The cell 110 transmits to the mobile station 101, an instruction message instructing the start of the carrier aggregation using the cell 110 as the primary cell (step S1302). The mobile station 101 sets the cell 110 to be the primary cell of the carrier aggregation and transmits a completion message to the cell 110 (step S1303).

The mobile station 101 sets the cell 110 to be the primary cell and starts the radio communication based on the carrier aggregation with the cells 110, 120, and 130 of the base station 100 (step S1304). For example, the mobile station 101 executes a process of establishing the C-plane with the cell 110 set to be the primary cell. In response to this, the cell 110 establishes the C-plane with the mobile station 101 using the cell information specific to the cell 110.

It is assumed that the primary cell of the carrier aggregation between the mobile station 101 and the base station 100 is changed from the cell 110 to the cell 120. In this case, the cell 120 outputs to the cell 110, the cell information specific to the cell 120 (step S1305).

The cell 110 transmits an instruction message instructing the start of the carrier aggregation using the cell 120 as the primary cell, to the mobile station 101 through, for example, the cells 110, 120, and 130 (step S1306). The mobile station 101 sets the primary cell of the carrier aggregation to be the cell 120 and transmits a completion message to the cell 120 (step S1307). The completion message transmitted at step S1307 is transferred to the cell 120 by, for example, the cells 110, 120, and 130.

The mobile station 101 sets the cell 120 to be the primary cell and starts the radio communication based on the carrier aggregation with the cells 110, 120, and 130 of the base station 100 (step S1308). For example, the mobile station 101 executes the process of establishing the C-plane with the cell 120 set to be the primary cell. In response to this, the cell 110 establishes the C-plane with the mobile station 101, using the cell information specific to the cell 120 output at step S1305.

The C-plane established with the mobile station 101 may directly be terminated by the cell 110 or may be terminated by the cell 110 through the cells 120 and 130. Therefore, the cell 120 is set to be the primary cell in the mobile station 101 while the cell 110 executes processing as the primary cell (the RRC process). The mobile station 101 establishes a radio link with each of the cells 110, 120, and 130 and executes transmission of the user data.

Thus, during the communication based on the carrier aggregation between the mobile station 101 and the cells 110, 120, and 130, the cell 110 executes processing as the primary cell even when the primary cell is changed. Therefore, no complicated handing-over operation (such as the change of the secrecy key) occurs associated with the change of the primary cell. Therefore, instantaneous interruptions and delays of the communication can be suppressed and the radio communication can be stabilized for the radio communication based on the carrier aggregation between the mobile station 101 and the cells 110, 120, and 130.

At step S1305, the cell information is output by, for example, a "x2 interface". Each of the instruction messages transmitted at steps S1302 and S1306 is, for example, "RRC Reconfiguration" transmitted as an RRC signal. Each of the completion messages transmitted at steps S1303 and S1307 is, for example, "RRC Reconfiguration Complete" transmitted as an RRC signal.

FIG. 14 is a flowchart of an example of a process of the cell corresponding to the second configuration example depicted in FIG. 12. The cell 110 depicted in FIG. 12 executes, for example, process steps depicted in FIG. 14 when the cell 110 executes the radio communication using a single carrier component with the mobile station 101. Although a process executed by the cell 110 will be described, the cells 120 and 130 may each execute the same process. Steps S1401 and S1402 depicted in FIG. 14 are respectively same as steps S1101 and S1102 depicted in FIG. 11.

After step S1402, the cell 110 determines whether the cell 110 is the primary cell of the carrier aggregation (step S1403). For example, the cell immediately previously executing the radio communication with the mobile station 101 is set to be the primary cell of the carrier aggregation. For example, if the carrier aggregation is started in the example depicted in FIG. 13, the cell 110 is the primary cell of the carrier aggregation.

If the cell 110 determines at step S1403 that the cell 110 is not the primary cell of the carrier aggregation (step S1403: NO), the cell 110 causes the series of operations to come to an end. Thereafter, the cell 110 executes transmission and reception by one of the carrier components included in the carrier aggregation executed between the mobile station 101 and the base station 100.

If the cell 110 determines at step S1403 that the cell 110 is the primary cell of the carrier aggregation (step S1403: YES), the cell 110 progresses to the operation at step S1404. The cell 110 outputs the cell information specific to the cell 110 to the shared cell controlling the radio communication based on the carrier aggregation (step S1404) and causes the series of operations to come to an end. Thereafter, the cell 110 executes transmission and reception by one of the carrier components included in the carrier aggregation executed between the mobile station 101 and the base station 100.

As described, according to the base station 100 of the second embodiment, any one of the cells 110, 120, and 130 can control the series of radio communication sessions between the mobile station 101 and the base station 100 based on the carrier aggregation. Thereby, the carrier aggregation can be executed without executing any complicated switching operation for the primary cell that controls the radio communication. Therefore, instantaneous interruptions and delays of the radio communication can be suppressed and the radio communication can be stabilized.

As described, according to the base station, the communication system, and the communication method, radio communication can be stabilized.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication system comprising: a mobile station and a base station, wherein the base station includes a plurality of first communication units and a second communication unit, wherein each of the plurality of first communication units includes a physical layer processing unit that executes physical layer processes and a data link layer processing unit that executes data link layer processes of radio communication between the base station and a mobile station, and a network layer processing unit that executes network layer processes of the radio communication; and wherein the second communication unit includes: a control unit that executes a radio resource control function by terminating a control signal system established with the mobile station through the physical layer processing unit and the data link layer processing unit, and a user data processing unit that executes a user data process by terminating a user data system established with the mobile station through the physical layer processing unit and the data link layer processing unit;

the communication system further comprising:
controlling, by the second communication unit, a series of radio communication sessions between the base station and the mobile station, based on carrier aggregation using the physical layer processing unit and data link layer processing unit of each of the first communication units.

2. A communication system comprising: a mobile station and a base station, wherein the base station includes a plurality of communication units, wherein each of the plurality of communication units includes a physical layer processing unit that executes physical layer processes and a data link layer processing unit that executes data link layer processes of radio communication between the base station and the mobile station, and a network layer processing unit that executes network layer processes of the radio communication wherein the network layer processing unit includes:

a control unit that has a radio resource control function of terminating a control signal system established with the mobile station through the physical layer processing unit and the data link layer processing unit, and a user data processing unit that terminates a user data system established with the mobile station through the physical layer processing unit and the data link layer processing unit;

the communication system further comprising:

controlling, by the network layer processing unit of a communication unit among the plurality of communication units, a series of radio communication sessions between the base station and the mobile station, based on carrier aggregation using the physical layer and data link layer processing unit of each of the communication units.

* * * * *